US012656987B2

(12) United States Patent
Yu et al.

(10) Patent No.: US 12,656,987 B2
(45) Date of Patent: Jun. 16, 2026

(54) IMAGE PROCESSING METHOD AND APPARATUS, DEVICE, STORAGE MEDIUM, AND PROGRAM PRODUCT

(71) Applicant: Beijing Zitiao Network Technology Co., Ltd., Beijing (CN)

(72) Inventors: Yubin Yu, Beijing (CN); Dayu Qiu, Beijing (CN); Ruchong Luo, Beijing (CN); Huilin Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/855,989

(22) PCT Filed: Apr. 4, 2023

(86) PCT No.: PCT/CN2023/086211
§ 371 (c)(1),
(2) Date: Oct. 10, 2024

(87) PCT Pub. No.: WO2023/197912
PCT Pub. Date: Oct. 19, 2023

(65) Prior Publication Data
US 2025/0244936 A1      Jul. 31, 2025

(30) Foreign Application Priority Data
Apr. 11, 2022    (CN) .......................... 202210375988.4

(51) Int. Cl.
*G09G 5/00*          (2006.01)
*G06F 3/14*          (2006.01)
(Continued)

(52) U.S. Cl.
CPC .................. *G06F 3/14* (2013.01); *G06T 7/10* (2017.01); *G06T 7/20* (2013.01); *G06T 7/593* (2017.01); *G06V 10/25* (2022.01)

(58) Field of Classification Search
CPC ... G06F 3/14; G06T 7/10; G06T 7/593; G06T 7/20; G06V 10/25
(Continued)

(56) References Cited

U.S. PATENT DOCUMENTS

2023/0052088 A1* 2/2023 Zhou ....................... A63F 13/69
2023/0330530 A1* 10/2023 Yan .......................... A63F 13/52

FOREIGN PATENT DOCUMENTS

CN          106296789 A      1/2017
CN          109064390      * 12/2018   ............. G06T 11/60
(Continued)

OTHER PUBLICATIONS

China National Intellectual Property Administration, First Office Action Issued in Application No. 202210375988.4, May 24, 2024, 20 pages.
(Continued)

*Primary Examiner* — Jennifer T Nguyen
(74) *Attorney, Agent, or Firm* — Alleman Hall LLP

(57) ABSTRACT

The present disclosure relates to an image processing method and apparatus, a device, a storage medium, and a program product. The image processing method includes: acquiring a mask image of a target object, wherein the target object is in a moving state or a static state, and a prop image is in a moving state; and displaying the target object and the prop image on the basis of a position relationship between the mask image of the target object and the prop image in response to the prop image having a shielding relationship with the target object during a moving process of the prop image.

20 Claims, 7 Drawing Sheets

(51) Int. Cl.
| | |
|---|---|
| *G06T 7/10* | (2017.01) |
| *G06T 7/20* | (2017.01) |
| *G06T 7/593* | (2017.01) |
| *G06V 10/25* | (2022.01) |

(58) Field of Classification Search
USPC ........................................................ 345/156
See application file for complete search history.

(56) References Cited

FOREIGN PATENT DOCUMENTS

| | | | | | |
|---|---|---|---|---|---|
| CN | 109064390 | A | | 12/2018 | |
| CN | 109348277 | B | | 2/2019 | |
| CN | 110929651 | A | | 3/2020 | |
| CN | 112544070 | | * | 3/2021 | ........... H04N 5/2621 |
| CN | 112544070 | A | | 3/2021 | |
| CN | 113222830 | A | | 8/2021 | |
| CN | 113240692 | A | | 8/2021 | |
| CN | 113628132 | A | | 11/2021 | |
| CN | 114693780 | A | | 7/2022 | |
| WO | 2021238325 | A1 | | 12/2021 | |

OTHER PUBLICATIONS

China National Intellectual Property Administration, Second Office Action Issued in Application No. 202210375988.4, Aug. 6, 2024, 16 pages.
ISA China National Intellectual Property Administration, International Search Report and Written Opinion Issued in Application No. PCT/CN2023/086211, May 22, 2023, WIPO, 15 pages.
Haoji007, "Automatic Portrait Segmentation for Image Stylization," CSDN, Available Online at https://blog.csdn.net/haoji007/article/details/88387455, Mar. 11, 2019, 25 pages.
China National Intellectual Property Administration, Third Office Action Issued in Application No. 202210375988.4, Oct. 18, 2024, 14 pages.

\* cited by examiner

| Acquire a mask image of a target object | S10 |

↓

| Determine an overlapping portion of the prop image and the mask image of the target object | S21 |

↓

| Determine whether to display the overlapping portion of the prop image according to a display attribute corresponding to the overlapping portion | S22 |

IMAGE PROCESSING METHOD AND APPARATUS, DEVICE, STORAGE MEDIUM, AND PROGRAM PRODUCT

CROSS-REFERENCE TO RELATED APPLICATIONS

The present application is a U.S. National Stage Application under 35 U.S.C. § 371 of International Patent Application No. PCT/CN2023/086211, filed on Apr. 4, 2023, which claims priority to China Patent Application No. 202210375988.4 filed on Apr. 11, 2022, the disclosures of both of which are incorporated by reference in their entireties.

TECHNICAL FIELD

The present disclosure relates to an image processing method and apparatus, a device, a storage medium and a program product.

BACKGROUND

With the development of communication technology and terminal device, various terminal device, such as mobile phone, tablet computer, etc., has become an indispensable portion of people's work and life, and with the increasing popularity of terminal device, an image interaction application has become a main channel of entertainment.

SUMMARY

In a first aspect, an embodiment of the present disclosure provides an image processing method, comprising: acquiring a mask image of a target object, wherein the target object is in a moving state or a static state, and a prop image is in a moving state; and displaying the target object and the prop image based on a position relationship between the mask image of the target object and the prop image in response to the prop image having a shielding relationship with the target object during a moving process of the prop image.

In a second aspect, an embodiment of the present disclosure provides an image processing apparatus, comprising: a mask image acquisition module configured to acquire a mask image of a target object, wherein the target object is in a moving state or a static state, and a prop image is in a moving state; and a display module configured to display the target object and the prop image based on a position relationship between the mask image of the target object and the prop image in response to the prop image having a shielding relationship with the target object during a moving process of the prop image.

In a third aspect, an embodiment of the present disclosure provides an electronic device, comprising: one or more processors; and a storage device configured to store one or more programs, wherein the one or more programs, when executed by the one or more processors, cause the one or more processors to implement the method as described in any of the first aspect.

In a fourth aspect, an embodiment of the present disclosure provides a computer storage medium having stored thereon a computer program which, when executed by a processor, implements the method as described in any of the first aspect.

In a fifth aspect, an embodiment of the present disclosure provides a computer program product which, when run on a computer, causes the computer to perform the method as described in any of the first aspect.

In a sixth aspect, an embodiment of the present disclosure provides a computer program, comprising: instructions that, when executed by a processor, cause the processor to perform the method as described in any of the first aspect.

BRIEF DESCRIPTION OF THE DRAWINGS

The accompanying drawings, which are incorporated in and constitute a part of this specification, illustrate embodiments in accordance with the present disclosure and, together with this specification, serve to explain the principles of the present disclosure.

In order to explain a technical solution in an embodiment of the present disclosure or the related art more clearly, a simple introduction to the accompanying drawings required to be used in descriptions of the embodiments or the related art is provided below. Obviously, those skilled in the art can obtain other drawings based on these accompanying drawings without paying the cost of creative work.

DETAILED DESCRIPTION

In order understand the above objectives, features, and advantages more clearly, a solution of the present disclosure will be further described below. It should be noted that, if without a conflict, the embodiments and features in the embodiments of the present disclosure can be combined with each other.

Many specific details are elaborated in the following description to facilitate a full understanding of the present disclosure, but the present disclosure may be implemented in other ways different from those described herein; obviously, the embodiments in the description are only a portion of embodiments of the present disclosure, not all of them.

Diversity of image interaction is achieved by adding effects by means of adding prop images to images, and implementing effects.

Figure 1:
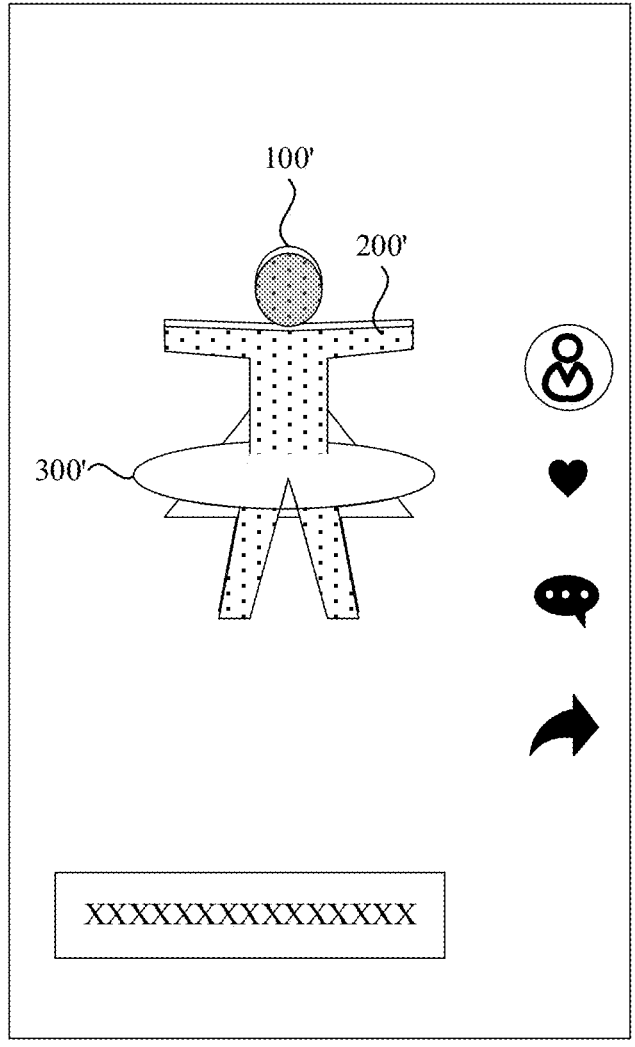
FIG. 1 is a schematic view showing an interface for adding a prop image to an image in the related art.

FIG. 1 shows an effect of adding a prop image to the image in the related art. In the related art, in order to achieve that part of a prop image is shielded by a target object, the target object is simulated based on an algorithm driven model, and then based on a position relationship between the simulated target object and the prop image, it is achieved that part of the prop image is shielded by the target object. However, as known from FIG. 1, a simulated target object 200' based on the algorithm driven model can only simulate structural features of a target object 100', but cannot simulate an additional feature of the target object 100'. For example, if the target object is a person, the algorithm driven model simulates the structural features of the person, such as body structure, but the additional feature of the person, such as hair or clothes, cannot be simulated. When the simulated target object 200' and the prop image 300' are displayed based on the position relationship between the simulated target object and the prop image, there will be a problem as shown in FIG. 1, that is, the prop image located between the legs of the simulated target object 200' should be shielded by the target object; however, since the target object simulated by the algorithm model cannot simulate the additional feature such as human skirt, etc., shielding the prop image based on the simulated target object may not be able to be achieved in this section, thereby reducing realism in displaying image props in an image comprising the target object.

Therefore, the inventors of the present disclosure found that in the related art where an effect is added to an image, in a method of shielding the effect through a target object in the image, the shielding is simulated based on 3D (three dimensions) model of the identified target object. However, in the process of using the 3D model to simulate the shielding, the 3D model may not be able to simulate the additional feature of the target object, such as hair, skirt, etc., and thus the simulated shielding effect is affected. In the related art, the image processing method may not be able to achieve a good shielding effect and may consume significant performance.

In view of this, an embodiment of the present disclosure provides an image processing method to achieve that part of a prop image can be shielded based on a mask image of a target object, thereby improving realism of a prop displayed in an image comprising the target object.

The present embodiment is applicable to the case of adding a prop image to an image. The method can be performed by an image processing apparatus, wherein the image processing apparatus can be implemented in the form of software and/or hardware, and can be configured in a terminal device, for example, a computer, etc.

The terminal device can be a tablet computer, a mobile phone, a wearable device, an in-vehicle device, an augmented reality (AR)/virtual reality (VR), a notebook computer, a ultra-mobile personal computer (UMPC), a netbook, a personal digital assistant (PDA), a smart television, a smart screen, a high definition television, 4K television, a smart speaker, a smart projector, etc. The present disclosure does not impose any limitation on the specific type of the electronic device.

The present disclosure does not limit a type of an operating system of the electronic device, such as, Android system, Linux system, Windows system, iOS system, etc.

The technical solution of the present disclosure is described below by using several specific embodiments.

Figure 2:
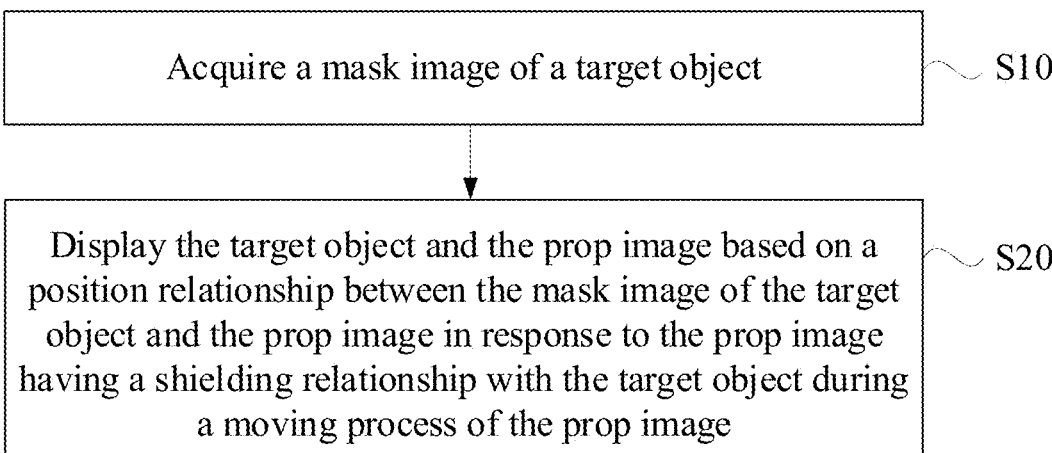
FIG. 2 is a flowchart showing an image processing method provided in an embodiment of the present disclosure.

FIG. 2 is a flowchart showing an image processing method provided in the present disclosure. As shown in FIG. 2, the image processing method comprises steps S10 to S20.

In step S10, a mask image of a target object is acquired.

The target object is in a moving state or a static state, and a prop image is in a moving state.

The target object may be in a moving state, or a static state. When the target object is in the static state, the mask image of the target object can be acquired by means of real-time acquisition, or can be acquired only once or at a preset time interval, so as to reduce computation, and since the acquired mask images are all the same when the target object is in the static state, they can be applied to the process of processing picture effects. When the target object is in the moving state, the mask image of the target object is acquired by means of real-time acquisition which can acquire every frame image or every few frame images. The specific image acquisition interval is related to the moving speed, amplitude, and so on of the target object, which can be determined according to empirical values or actual application scenarios so as to improve accuracy of the acquired mask image and can be applied to the process of processing video effects.

For example, the prop image, such as a circular prop, a elliptical prop, an elf prop, etc., can be applied to effect scenarios where images are processed, wherein the prop image is in a moving state. Specifically, the prop image may move around the target object in the image comprising the target object, and alternatively the prop image may not move around the target object in the image comprising the target object. The embodiments of the disclosure do not limit the specific motion state of the prop image.

The acquired mask image of the target object can be a mask image of the target object in a certain image, or a mask image of the target object in a video, while the video is formed by a series of static image frames which are played continuously in a very fast speed. Therefore, the video can be divided into a series of image frames which are subjected to editing operations, so as to achieve the editing operation on the video. In the embodiment of the present disclosure, the image processing method can be a process of processing a certain image, or a process of processing every frame image in a video, wherein the video may be a complete recorded video, or a video that is recording in real-time.

The image is formed by a plurality of pixel points, wherein pixel points at different locations have different pixel values. After acquiring an image or an image frame, based on a pixel value of each pixel point corresponding to the image or the image frame, a pixel point corresponding to the target object is determined. By preparing a specific mask (wherein the mask is the same as the pixel point corresponding to the image or the image frame, and a mask value at a position in the mask that coincides with a pixel point of the target object in the image or the image frame is the same as the pixel value of the target object), a mask image of the target object can be obtained by operating the pixel values corresponding to the image or image frame with the mask.

For example, the pixel values of pixel points corresponding to a certain image are $$\begin{bmatrix} 16 & 145 & 123 & 110 \\ 12 & 23 & 28 & 113 \\ 18 & 201 & 40 & 45 \\ 152 & 256 & 16 & 87 \end{bmatrix},$$

wherein the pixel points 145, 123, 23, 28, 201 are pixel points corresponding to the positions where the target object in the image is located, consequently the prepared mask is $$\begin{bmatrix} 0 & 145 & 123 & 0 \\ 0 & 23 & 28 & 0 \\ 0 & 201 & 0 & 0 \\ 0 & 0 & 0 & 0 \end{bmatrix},$$

and the mask image of the target object is obtained by operating the pixel points corresponding to the image with the mask.

It should be noted that in a specific implementation, during the operation of the pixel points corresponding to the image with the mask, if the pixel points corresponding to the image and the pixel points of the mask are the same, the pixel values of the pixel points corresponding to the image are displayed; if the pixel points corresponding to the image and the pixel points of the mask are not the same, pixel value 0 or pixel point 256 are displayed. At this time, the pixel value 0 or pixel point 256 in the image are displayed in black or red correspondingly.

In addition, in the above embodiment, the pixel value corresponding to the pixel point represents the color displayed in the position, the position of the target object in the image can be determined by configuring to display color corresponding to the image in positions corresponding to the target object while configuring to display black and red in positions corresponding to the non-target object.

In other implementations, after determining the positions of the target object in the image, the pixel values in the positions of the target object can be configured to be different from the pixel values in positions corresponding to the non-target object, so as to facilitate determining position information of the target object.

In step S20, the target object and the prop image are displayed based on a position relationship between the mask image of the target object and the prop image in response to the prop image having a shielding relationship with the target object during a moving process of the prop image.

In response to the prop image being in the moving state, if the prop image moves around the target object, at this time, there exist phenomena that the prop image shields the target object and the prop image is shielded by the target object during the moving process of the prop image. For example, in combination with FIGS. 2A and 2B, the prop image 300 is an elliptical prop, and the prop image 300 moves around the target object 200. At this time, there exists a shielding relationship between the prop image and the target object during the moving process of the prop image. By setting a display attribute of the prop image relative to the mask image of the target object, the target object and the prop image displayed are determined.

Figure 2A:
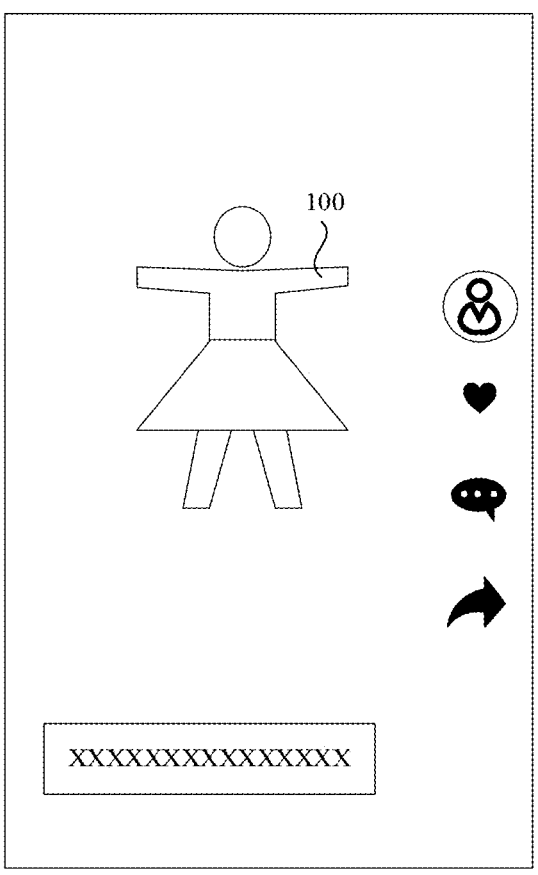
FIG. 2A is a schematic view showing an interface for adding a prop image to an image provided in an embodiment of the present disclosure.
Figure 2B:
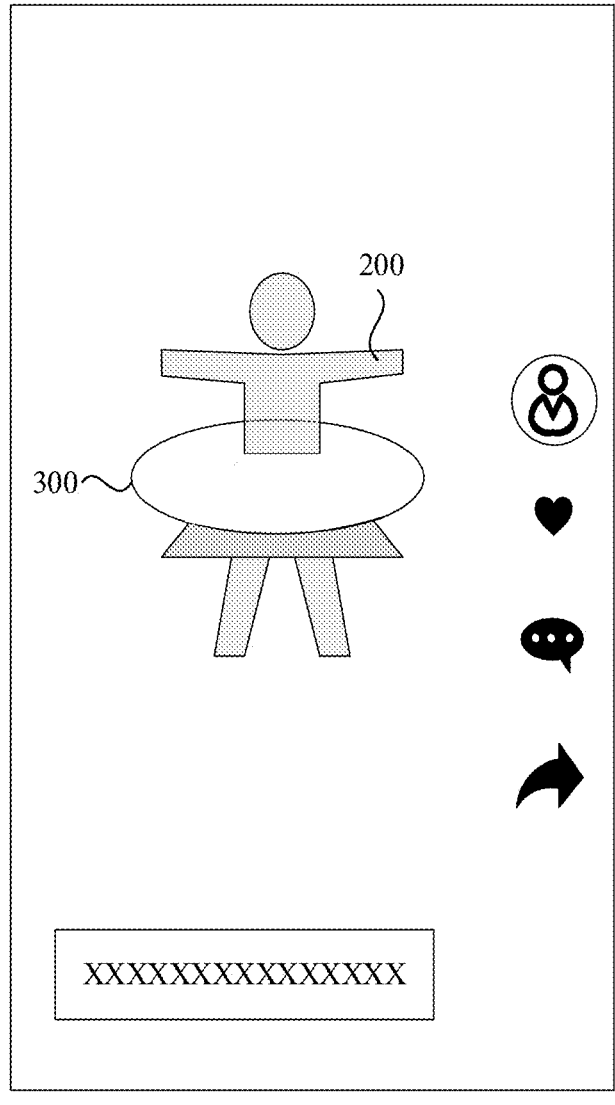
FIG. 2B is a schematic view showing another interface for adding a prop image to an image provided in an embodiment of the present disclosure.

It should be noted that FIGS. 2A and 2B illustratively show the shielding relationship between the prop image and the target object when the prop image moves to the front of or the target object or when the prop image moves to the back of the target object. In other implementations, the shielding relationship between the prop image and the target object can also be shown in other forms. For example, provided that the target object is distinguished based on a left portion and a right portion, when the prop image is moving, if the prop image has a shielding relationship with the left portion of the target object (the prop image is in front of the target object, or the prop image is behind the target object), the target object is displayed at this time; if the prop image has a shielding relationship with the right portion of the target object (the prop image is in front of the target object, or the prop image is behind the target object), the prop image is displayed at this time. For another example, provided that the target object is distinguished based on an upper portion and a lower portion, when the prop image is moving, if the prop image has a shielding relationship with an upper portion of the target object (the prop image is in front of the target object, or the prop image is behind the target object), the target object is displayed at this time; when the prop image is moving, if the prop image has a shielding relationship with a lower portion of the target object (the prop image is in front of the target object, or the prop image is behind the target object), the prop image is displayed at this time.

For example, referring to FIG. 2A, in which the image comprises a target object 100. By processing the image, a mask image 200 of the target object in the image is acquired, as shown in FIG. 2B. By adding a prop image 300 to the image, such as an elliptical prop, based on the position relationship between the mask image 200 of the target object in the image and the prop image 300, the target object and the prop image are displayed. In FIG. 2B, based on the display attribute of the prop image 300, it is determined whether a portion where the mask image of the target object overlaps with the prop image displays an image. FIG. 2B illustratively shows that in the portion where the mask image of the target object overlaps with the prop image 300, the prop image 300 located in front of the mask image of the target object is displayed, while the prop image 300 located behind the mask image of the target object is not displayed.

By displaying the target object and the prop image based on the position relationship between the mask image of the target object and the prop image, it is achieved that part of the prop image can be shielded based on the mask image of the target object, thereby improving realism of the prop displayed in the image comprising the target object.

It should be noted that the above embodiment exemplifies the way in which the target object and the prop image are displayed at the overlapping part of the mask image of the target object and the prop image. In the specific implementation, the image may not only comprise the target object, but also comprise other images. In this case, the other images and the prop image are displayed in a normal way. The embodiment of the present disclosure does not impose specific limitations on this.

In addition, since in the image processing method provided in the embodiment of the disclosure, the target object and prop image are displayed based on the position relationship between the mask image of the target object and the prop image, that is, the acquired mask image of the target object can not only represent the structural feature of the target object, but also represent the additional feature of the target object. For example, if the target object is a human body, the target object not only comprises the structural feature of the human body, but also comprises the additional feature such as hair or clothes. Therefore, the acquired mask image of the target object can convert both the structural feature and the additional feature of the target object into corresponding mask images, and further when displaying the target object and the prop image based on the position relationship between the mask image of the target object and the prop image, it is achieved that part of the prop image can be shielded based on the masked image of the target object, thereby improving realism of the prop displayed in the image comprising the target object. In addition, when acquiring the mask image of the target object is compared with shielding the prop image through the 3D model simulating the target object in the related art, the present embodiment of the present disclosure does not need to simulate the target object through an algorithm driven 3D model, thereby being able to reduce performance loss in the image processing process.

The image processing method provided in the embodiment of the present disclosure, the mask image of the target object is acquired, the target object and the prop image are displayed based on the position relationship between the mask image of the target object and the prop image, that is, in the image processing method provided in the embodiment of the present disclosure, the mask image of the target object is obtained by processing the image, and then based on the mask image of the target object and a set display attribute of the prop image relative to the mask image of the target object, the target object and the prop image are displayed, such that based on the shielding of the prop image by the target object, the shielding effect of the target object on the prop image is ensured as much as possible, and realism of the prop displayed in the image comprising the target object is improved. Furthermore, since in the image processing method provided in the embodiment of the present disclosure, the prop image is shielded based on the mask image of the target object, compared with shielding the prop image based on 3D model simulating the target object in the related art, the embodiment of the present disclosure does not need to simulate the target object through an algorithm driven 3D model, thereby being able to reduce performance loss in the image processing process.

In a specific implementation, the prop image comprise a two-dimensional plane image and a three-dimensional stereo image. Illustratively, for example, for a circular prop or an elliptical prop, the prop image is a two-dimensional plane image. For example, for an elf prop, the prop image is a three-dimensional stereo image. The image processing method where the prop image is a two-dimensional plane image or a three-dimensional stereo image will be explained below through specific embodiments.

Figure 3:
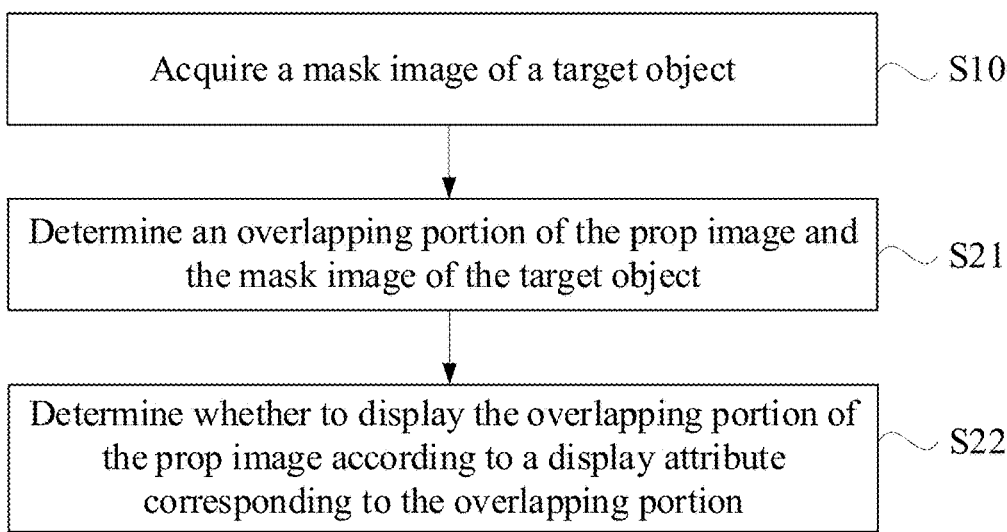
FIG. 3 is a flowchart showing another image processing method provided in an embodiment of the present disclosure.

FIG. 3 is a flowchart showing another image processing method provided in an embodiment of the present disclosure. The embodiment of the present disclosure is based on the above embodiments, and FIG. 3 illustratively shows the image processing method where the prop image is a two-dimensional plane image. As shown in FIG. 3, one feasible approach of step S20 comprises steps S21 to S22.

In step S21, an overlapping portion of the prop image and the mask image of the target object is determined.

For example, in response to the prop image being a two-dimensional plane image, the prop image is divided into at least two portions, each portion of the at least two portions having a display attribute corresponding to the each portion, and the display attribute comprising display or not display.

Dividing basis, according to which the prop image is divided into at least two portions can be based on custom settings. For example, the prop image is divided based on front and back, or left and right. The embodiment of the present disclosure does not impose specific limitations on this.

After dividing the prop image into at least two portions, the display attribute corresponding to each portion after dividing is acquired.

After acquiring the mask image of the target object, when the prop image has a shielding relationship with the target object during the moving process of the prop image, first based on the display position of the prop image, the overlapping portion of the prop image and the mask image of the target object is determined. For example, referring to FIG. 3A, in which a dashed area represents an area where the prop image has a shielding relationship with the target object during the moving process of the prop image, that is, the overlapping portion of the mask image of the target object and the prop image.

In step S22, whether to display the overlapping portion of the prop image is determined according to a display attribute corresponding to the overlapping portion.

After dividing the prop image, the display attribute of each portion of the divided prop image is known. At this time, based on the display attribute of each portion of the divided prop image, whether to display the overlapping portion of the prop image is determined.

Figure 3A:
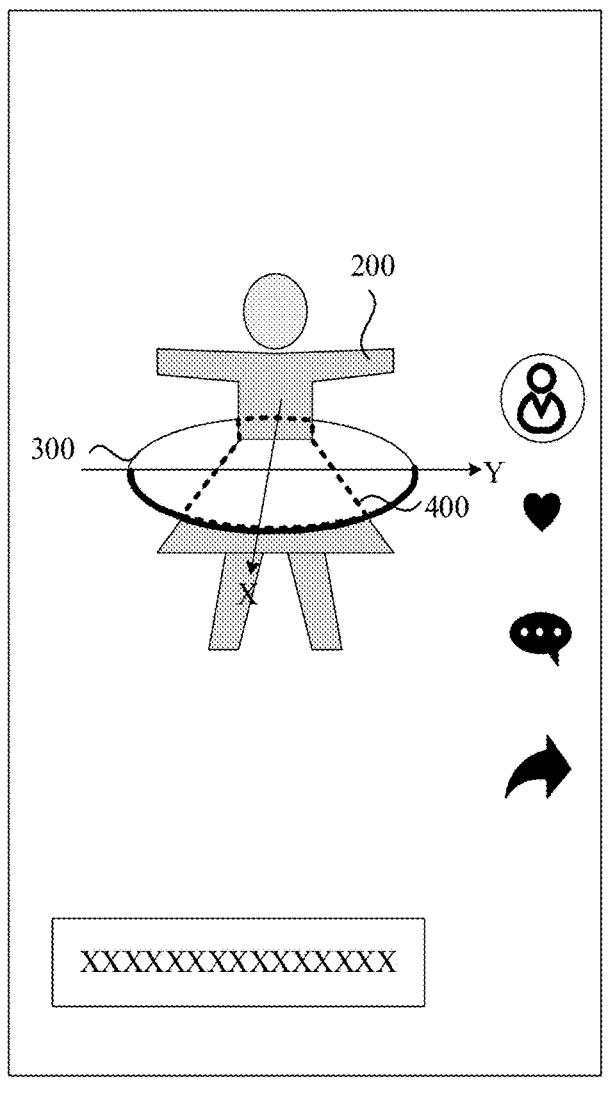
FIG. 3A is a schematic view showing another interface for adding a prop image to an image provided in an embodiment of the present disclosure.

For example, in combination with FIG. 3A, the prop image is an elliptical prop, and the prop image is divided into two portions: a front portion and a back portion, wherein in FIG. 3A, a solid thick line portion represents the front portion of the prop image, while a solid thin line portion represents the back portion of the prop image. The display attribute of the front portion of the prop image is display, and the display attribute of the back portion of the prop image is not display.

Since the display attribute of the front portion of the prop image is display, the prop image is displayed at the position where the mask image of the target object overlaps with the front portion of the prop image, and the target object is displayed at the position where the mask image of the target object overlaps with the back portion of the prop image.

As an implementation, for each coordinate point of the overlapping portion, it is determined that the each coordinate point belongs to a target portion of the prop image; in response to the display attribute of the target portion being display, the each coordinate point displays a pixel point of the prop image; in response to the display attribute of the target portion being not display, the each coordinate point displays a pixel point of the target object.

In some implementations, the coordinate points corresponding to the overlapping portion of the prop image and the mask image of the target object can be acquired, and based on each coordinate point, it is determined that the coordinate point belongs to the target portion of the prop image; in response to the display attribute of the target portion being display, the coordinate point displays the pixel point of the prop image; in response to the display attribute of the target portion being not display, the coordinate point displays the pixel point of the target object.

In some embodiments, the displaying of the target object and the prop image based on the position relationship between the mask image of the target object and the prop image further comprises: determining the display attribute of the overlapping portion.

For example, the determining of the display attribute of the overlapping portion comprises: establishing a plane coordinate system based on a center point O of the prop image in response to dividing the prop image into two portions (i.e., a front portion of the prop image and a back portion of the prop image) based on the front and back division, as shown in FIG. 3A; acquiring each coordinate point of the overlapping portion after determining the overlapping portion of the prop image and the mask image of the target object; indicating that the display attribute of the overlapping portion is display in response to a coordinate point on an X-axis corresponding to the overlapping portion being greater than 0; and indicating that the display attribute of the overlapping portion is not display in response to the coordinate point on the X-axis corresponding to the overlapping portion being less than 0.

It should be noted that the above embodiment exemplarily represents a constructed coordinate system, and determines the display attributes of the prop image based on the coordinate points. The embodiment of the present disclosure does not impose specific limitations on the constructed coordinate system.

In the image processing method provided in the embodiment of the present disclosure, in the case where the prop image is a two-dimensional plane image, a mask image of the target object is first acquired, and then, when the prop image has a shielding relationship with the target object during a moving process of the prop image, an overlapping portion of the prop image and the mask image of the target object is determined, whether to display the overlapping portion of the prop image is determined based on attribute information corresponding to the overlapping portion, such that when the prop image is a two-dimensional plane image, a shielding to the prop image based on the target object is achieved, thereby ensuring shielding effect of the target object on the prop image as far as possible, and improving realism of the prop image displayed in the image comprising the target object.

Figure 4:
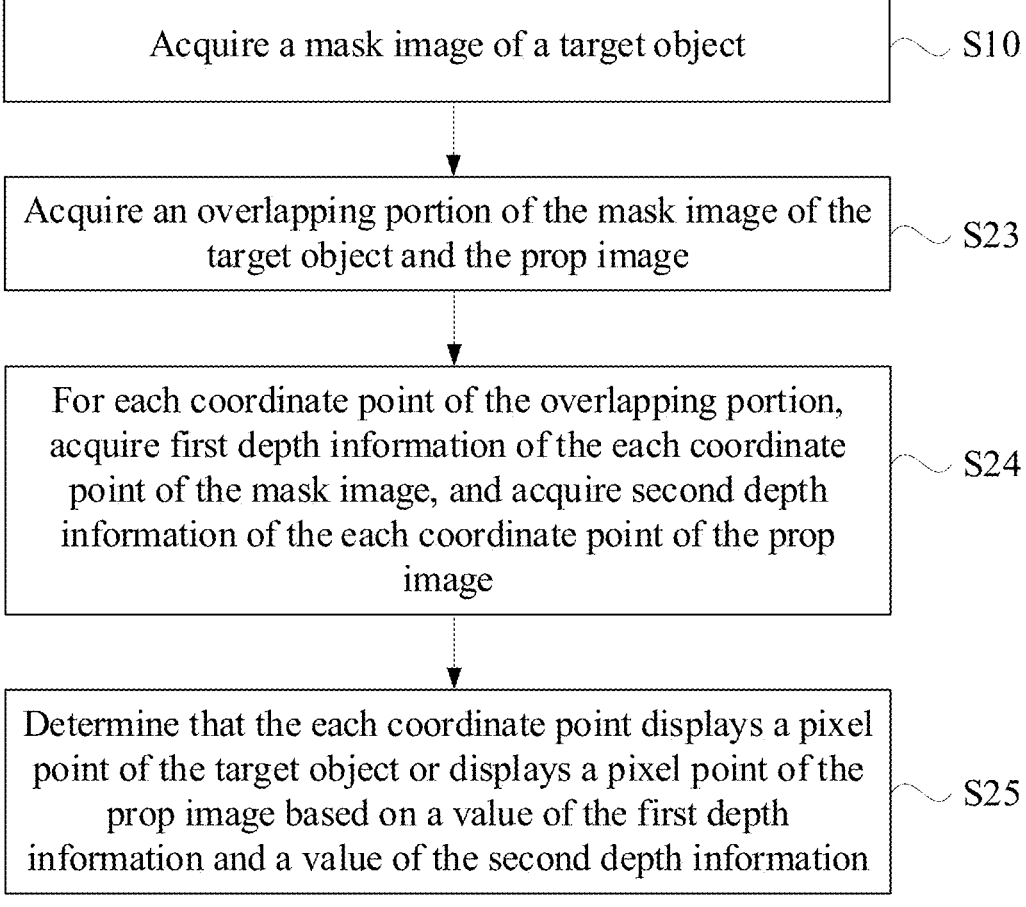
FIG. 4 is a flowchart showing another image processing method provided in an embodiment of the present disclosure.

FIG. 4 is a flowchart showing another image processing method provided in an embodiment of the present disclosure. The embodiment of the present disclosure is based on the above embodiments, and FIG. 4 illustratively explains the image processing method where the prop is a three-dimensional stereo image. As shown in FIG. 4, another feasible approach of step S20 comprises steps S23 to S25.

In step S23, an overlapping portion of the mask image of the target object and the prop image is acquired.

In response to the prop image being a three-dimensional stereo image, the overlapping portion of the mask image of the target object and the prop image is first acquired.

For example, the prop image is a three-dimensional stereo image, means that the prop image has a certain thickness. FIG. 4 illustratively shows a schematic structural view of a prop image 300.

In step S24, for each coordinate point of the overlapping portion, first depth information of the each coordinate point of the mask image is acquired, and second depth information of the each coordinate point of the prop image is acquired.

In response to the prop image being the three-dimensional stereo image, the prop image has a certain thickness, namely, the prop image comprises depth information. Therefore, after acquiring the overlapping portion of the mask image of the target object and the prop image, for each coordinate point of the overlapping portion, the first depth information of the each coordinate point of the mask image and the second depth information of the each coordinate point of the prop image are acquired.

In some embodiments, the acquiring of the first depth information of the each coordinate point of the mask image comprises: constructing a target object box based on the mask image, wherein the target object box has depth information; and determining the first depth information of the each coordinate point of the mask image based on the depth information of the target object box.

The acquiring of the first depth information of the coordinate point of the mask image, can be determined based on acquired texture information of the image. For example, after acquiring the texture information of the image, the mask image is acquired based on the texture information of the image, and then the depth information corresponding to the image is sieved through the mask image. In the process of sieving the depth information corresponding to the image based on the mask image, the sieving is performed based on a feature of the target object in the image. Illustratively, when the target object in the image is a person, the first depth information of the target object can be sieved based on an elliptical sieving method. For example, a target object box is constructed based on the mask image, wherein the target object box has the depth information, while a middle portion of the target object is thicker and an edge portion of the target object is thinner. Therefore, the corresponding first depth information of the target object is that the closer to a center point of the person, the less the first depth information is, and the closer to the edge of the person, the greater the first depth information is.

Figure 4A:
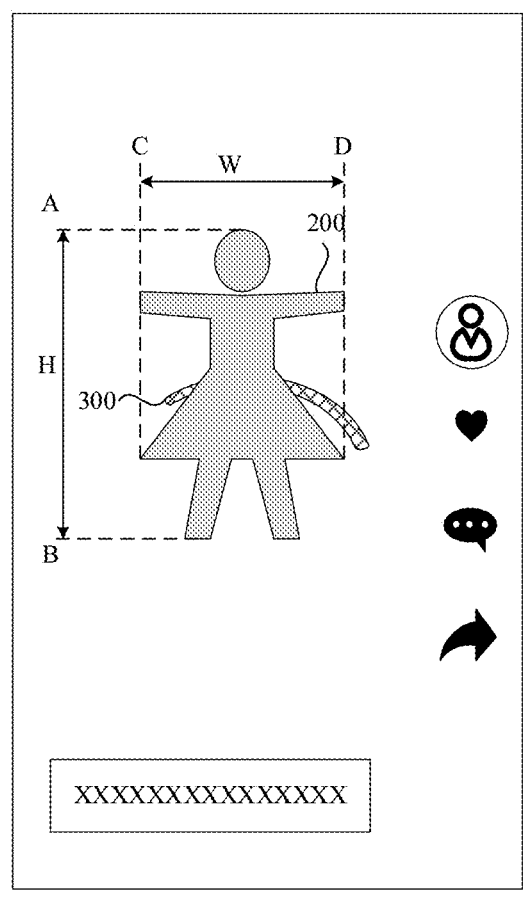
FIG. 4A is a schematic view showing another interface for adding a prop image to an image provided in an embodiment of the present disclosure.
Figure 4B:
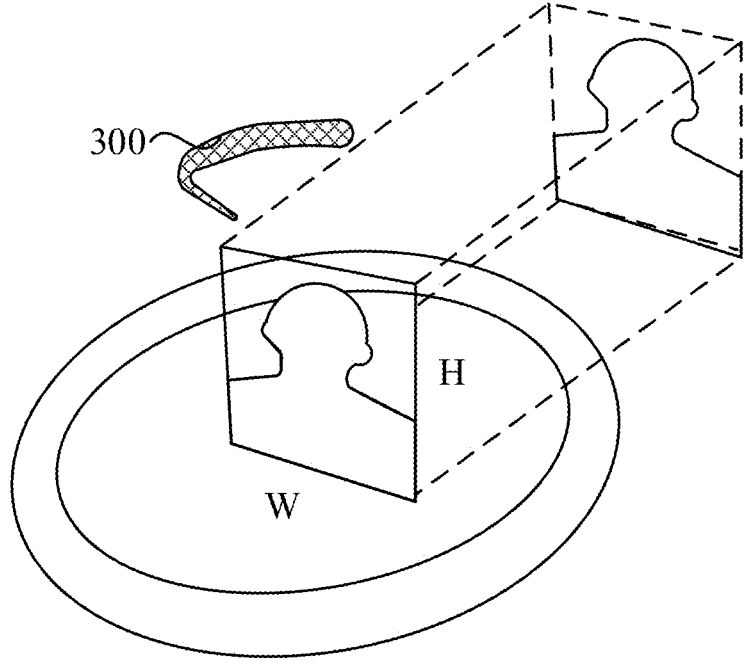
FIG. 4B is a schematic structural view showing a target object box constructed in an embodiment of the present disclosure.

Illustratively, the target object box is constructed based on the mask image, as shown in FIG. 4B, wherein a center point of the target object box is a center point of the target object, height information of the target object box is a height from a highest point of the target object to a lowest point of the target object, and width information of the target object box is a width from a leftmost point of the target object to a rightmost point of the target object. For example, in combination with FIGS. 4A and 4B, the height information H of the target object box is a distance from point A to point B in FIG. 4A, the width information W of the target object box is a distance from point C to point D in FIG. 4A.

In some embodiments, the acquiring of the second depth information of the each coordinate point of the prop image comprises: determining the second depth information of the prop image based on position information of the prop image relative to a center point of the target object box.

In step S25, it is determined that the each coordinate point displays a pixel point of the target object or displays a pixel point of the prop image based on a value of the first depth information and a value of the second depth information.

In response to the prop image moving around the target object, based on a relationship between the second depth information of the prop image and the first depth information of the target object, it is determined that the coordinate point displays the pixel point of the target object or displays the pixel point of the prop image, wherein the prop image moves around the center point of the target object box, and the second depth information of the prop image is determined based on position information of the prop image relative to the center point of the target object box.

As an implementation, it is determined that the coordinate point displays the pixel point of the prop image in response to the value of the first depth information being greater than the value of the second depth information; and it is determined that the coordinate point displays the pixel point of the target object in response to the value of the first depth information being less than the value of the second depth information.

The depth information indicates a distance of the target object or prop image relative to a camera. The greater the depth information, the farther the target object or prop image is from the camera. If the value of the first depth information is greater than the value of the second depth information, it means that the distance between the prop image and the camera is less than the distance between the target object and the camera, then it is determined that the coordinate point displays the pixel point of the prop image. If the value of the first depth information is less than the value of the second depth information, it means that the distance between the prop image and the camera is greater than the distance between the target object and the camera, then it is determined that the coordinate point displays the pixel point of the target object.

In the image processing method provided in the embodiment of the present disclosure, in the case where the prop image is a three-dimensional stereo image, first the overlapping portion of the mask image of the target object and the prop image is acquired, and then for each coordinate point of the overlapping portion, the first depth information of the coordinate point of the mask image is acquired and the second depth information of the coordinate point of the prop image is acquired, so that it is achieved that based on the value of the first depth information and the value of the second depth information, it is determined that the coordinate point displays a pixel point of the target object or displays a pixel point of the prop image; it is achieved that when the prop image is a three-dimensional stereo image, based on the shielding of the prop image by the target object, the shielding effect of the target object on the prop image is ensured as much as possible, and realism of the prop image displayed in the image comprising the target object is improved.

Figure 5:
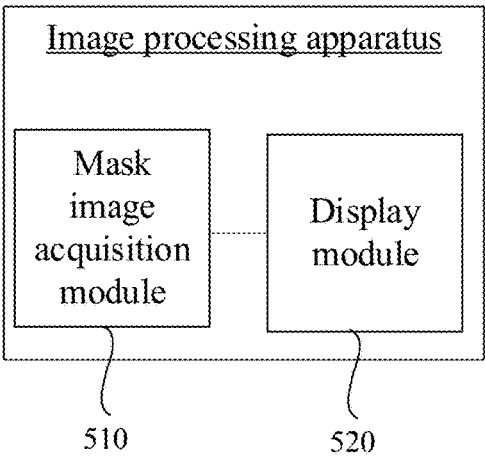
FIG. 5 is a schematic structural view showing an image processing apparatus provided in an embodiment of the present disclosure.

FIG. 5 is a schematic structural view showing an image processing apparatus provided in an embodiment of the present disclosure. As shown in FIG. 5, the image processing apparatus comprises a mask image acquisition module 510 and a display module 520.

The mask image acquisition module 510 is configured to acquire a mask image of a target object, wherein the target object is in a moving state or a static state, and a prop image is in a moving state.

The display module 520 is configured to display the target object and the prop image based on a position relationship between the mask image of the target object and the prop image in response to the prop image having a shielding relationship with the target object during a moving process of the prop image.

In the image processing apparatus provided in the embodiment of the present disclosure, the mask image acquisition module acquires the mask image of the target object, the display module displays the target object and the prop image based on the position relationship between the mask image of the target object and the prop image, that is, in the image processing method provided in an embodiment of the present disclosure, the mask image of the target object is obtained by processing the image, and the target object and the prop image are displayed based on the mask image of the target object and a set display attribute of the prop image relative to the mask image of the target object, such that based on the shielding of the prop image by the target object, the shielding effect of the target object on the prop image is ensured as much as possible, and realism of the prop displayed in the image comprising the target object is improved. Furthermore, since in the image processing method provided in the embodiment of the present disclosure, the prop image is shielded based on the mask image of the target object, compared with shielding the prop image based on 3D model simulating the target object in the related art, the embodiment of the present disclosure does not need to simulate the target object through an algorithm driven 3D model, thereby being able to reduce performance loss in the image processing process.

In some embodiments, the display module comprises: a first overlapping portion determining unit configured to determine an overlapping portion of the prop image and the mask image of the target object; and a first display unit configured to determine whether to display the overlapping portion of the prop image according to a display attribute corresponding to the overlapping portion.

In some embodiments, the first display unit is configured to: for each coordinate point of the overlapping portion, determine that the each coordinate point belongs to a target portion of the prop image; in response to the display attribute of the target portion being display, make the each coordinate point display a pixel point of the prop image; and in response to the display attribute of the target portion being not display, make the each coordinate point display a pixel point of the target object.

In some embodiments, the display module comprises: a display attribute determining unit configured to determine the display attribute of the overlapping portion.

In some embodiments, the display attribute determining unit is configured to establish a plane coordinate system based on a center point O of the prop image in response to dividing the prop image into a front portion of the prop image and a back portion of the prop image, acquire each coordinate point of the overlapping portion after determining the overlapping portion of the prop image and the mask image of the target object, indicate that the display attribute of the overlapping portion is display in response to a coordinate point on an X-axis corresponding to the overlapping portion being greater than 0, and indicate that the display attribute of the overlapping portion is not display in response to the coordinate point on the X-axis corresponding to the overlapping portion being less than 0.

In some embodiments, the display module comprises: a second overlapping portion determining unit configured to acquire an overlapping portion of the mask image of the target object and the prop image; a second depth information acquiring unit configured to, for each coordinate point of the overlapping portion, acquire first depth information of the each coordinate point of the mask image, and acquire second depth information of the each coordinate point of the prop image; and a second display unit configured to determine that the each coordinate point displays a pixel point of the target object or displays a pixel point of the prop image based on a value of the first depth information and a value of the second depth information.

In some embodiments, the second display unit is configured to determine that the each coordinate point displays the pixel point of the prop image in response to the value of the first depth information being greater than the value of the second depth information, and determine that the each coordinate point displays the pixel point of the target object in response to the value of the first depth information being less than the value of the second depth information.

In some embodiments, the second depth information acquiring unit is configured to construct a target object box based on the mask image, wherein the target object box has depth information, and determine the first depth information of the each coordinate point of the mask image based on the depth information of the target object box.

In some embodiments, a center point of the target object box is a center point of the target object, height information of the target object box is a height from a highest point of the target object to a lowest point of the target object, and width information of the target object box is a width from a leftmost point of the target object to a rightmost point of the target object.

In some embodiments, the second depth information acquiring unit is configured to determine the second depth information of the prop image based on position information of the prop image relative to a center point of the target object box.

It should be noted that in the above embodiments of the device, each unit and module comprised are only divided according to functional logic, but not limited to the above division, as long as the corresponding functions can be realized; in addition, the specific names of functional units are only for the convenience of distinguishing each other, and are not used to limit the protection scope of the disclosure.

The present disclosure also provides an electronic device, comprising: a processor configured to execute a computer program stored in a memory, the computer program, when executed by the processor, implementing the method of the above embodiments.

Figure 6:
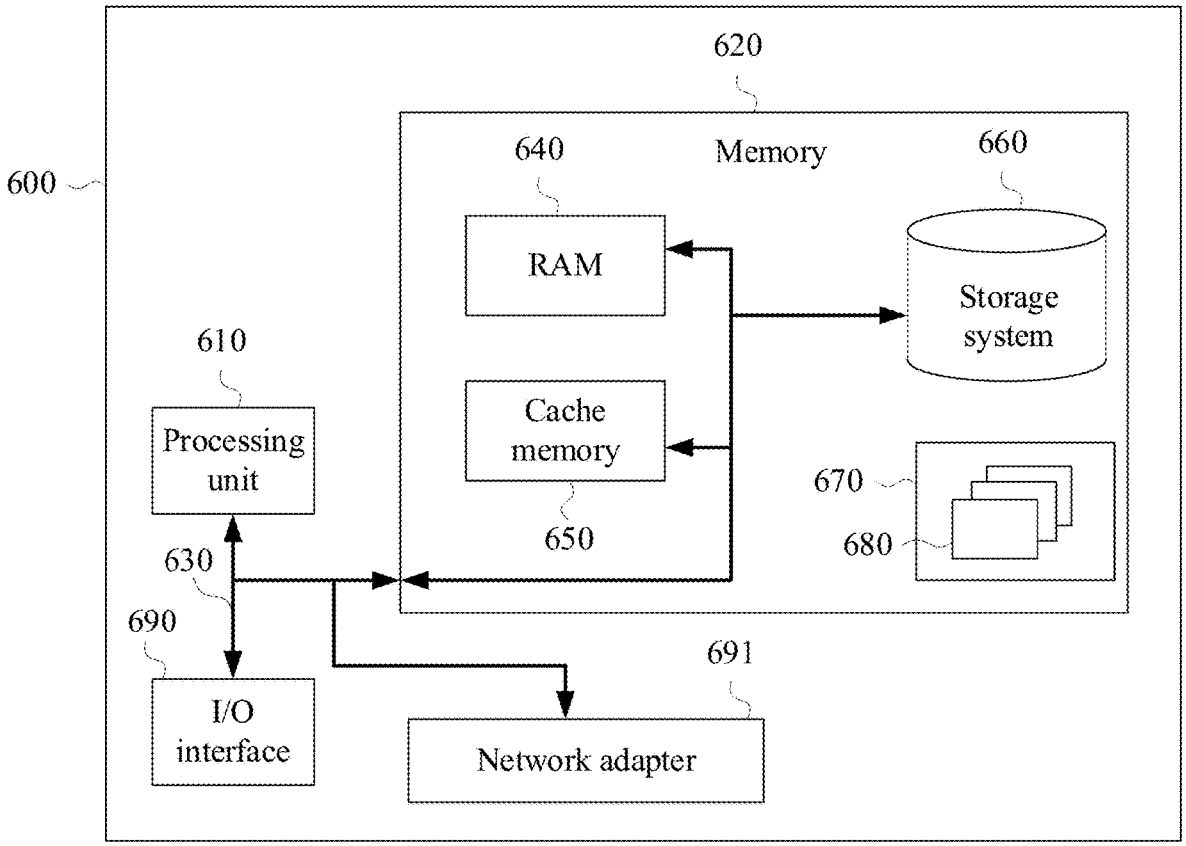
FIG. 6 is a schematic structural view showing an electronic device provided in an embodiment of the present disclosure.

FIG. 6 is a schematic structural view showing an electronic device provided in the present disclosure. FIG. 6 shows a block diagram of the illustrative electronic device suitable for implementing the embodiments of the present disclosure. The electronic device shown in FIG. 6 is only an example and should not bring any restrictions on functions and usage scope of the embodiments of the present disclosure.

As shown in FIG. 6, the electronic device 600 is represented in the form of a general-purpose computing equipment. Components of the electronic device 600 may comprise, but not limited to, one or more processors 610, a system memory 620, and a bus 630 connecting different system components (comprising the system memory 620 and the processor(s)).

The bus 630 indicates one or more of several types of bus structures, comprising memory bus or memory controller, peripheral bus, graphics acceleration port, local bus of processor or using any of multiple bus structures. For instance, these architectures comprise, but not limited to, Industry Standard Architecture (ISA) bus, Microchannel Architecture (MAC) bus, Enhanced ISA bus, Video Electronics Standards Association (VESA) local bus and Peripheral Component Interconnection (PCI) bus.

The electronic device 600 typically comprises multiple computer system readable media. These media can be any media that can be accessed by the electronic device 600, comprising volatile and nonvolatile media, removable and non-removable media.

The system memory 620 may comprise computer system readable media in the form of volatile memory, such as Random Access Memory (RAM) 640 and/or cache memory 650. The electronic device 600 may further comprise other removable/non-removable, volatile/nonvolatile computer system storage media. Only as an example, the storage system 660 may be used to read from and write to non-removable and nonvolatile magnetic media (commonly referred to as "hard disk drives"). A disk drive for reading from and writing to a removable nonvolatile magnetic disk (such as a "floppy disk") and an optical disk drive for reading from and writing to a removable nonvolatile optical disk (such as a CD-ROM, DVD-ROM or other optical media) can be provided. In these cases, each drive can be connected to the bus 630 through one or more data medium interfaces. The system memory 620 can comprise at least one program product having a set of (e.g., at least one) program modules configured to perform the functions of various embodiments of the present disclosure.

A program/utility 680 having a set of (at least one) program modules 670 may be stored in, for example, the system memory 620. Such program modules 670 comprises, but not limited to, an operating system, one or more application programs, other program modules and program data, and each or some combination of these examples may comprise implementation of a network environment. The program module 670 generally executes the functions and/or methods in the embodiments described in the embodiments of the present disclosure.

The processor 610 executes various functional applications and information processing by running at least one of multiple programs stored in the system memory 620, for example, to implement the method embodiments provided in the embodiments of the present disclosure.

In some embodiments, as shown in FIG. 6, the electronic device 600 further comprises an input/output (I/O) interface 690 and a network adapter 691.

The present disclosure also provides a computer-readable storage medium having stored thereon a computer program which, when executed by a processor, implements the method of the above embodiments. For example, the computer-readable storage medium is a non-transitory computer-readable storage medium.

Any combination of the one or more computer-readable media can be employed. The computer-readable medium can be a computer-readable signal medium or a computer-readable storage medium. The computer-readable storage medium can be, for example, but not limited to, an electrical, magnetic, optical, electromagnetic, infrared, or semiconductor system, device, or component, or any combination thereof. More specific examples (a non-exhaustive list) of the computer-readable storage medium may comprise, but not limited to: electrical connection with one or more wires, portable computer disk, hard disk, Random Access Memory (RAM), Read-Only Memory (ROM), Erasable Programmable Read-Only Memory (EPROM or flash), fiber optic, Portable Compact Disk Read-Only Memory (CD-ROM), optical storage device, magnetic storage device, or any suitable combination thereof. In this text, the computer-readable storage medium can be any tangible medium comprising or storing a program, which can be used by an instruction execution system, device, or component, or in combination with the same.

The computer-readable signal medium can comprise data signals propagated in the baseband or as a portion of the carrier wave, in which computer-readable program codes are carried. This type of propagated data signals can take various forms, comprising but not limited to electromagnetic signal, optical signal, or any suitable combination thereof. The computer-readable signal medium can also be any computer-readable medium other than the computer-readable storage medium, which can send, propagate, or transmit a program used by or in combination with the instruction execution system, device, or component.

The program codes comprised in the computer-readable medium can be transmitted using any suitable medium, comprising but not limited to: wireless, wire, optical cable, RF, etc., or any suitable combination thereof.

The computer program codes for executing operations of the present disclosure may be written in one or more programming languages or combinations thereof. The programming languages comprise object-oriented programming languages such as Java, Smalltalk, C++, and conventional procedural programming languages such as C programming language or similar programming languages. The program codes can be completely executed on a user's computer, partially executed on a user's computer, executed as an independent software package, partially executed on a user's computer and partially executed on a remote computer, or completely executed on a remote computer or server. In the case involving a remote computer, the remote computer can connect to the user's computer through any type of network (comprising Local Region Network (LAN) or Wide Region Network (WAN)), or can connect to an external computer (e.g. connect via the Internet using an Internet service provider).

The present disclosure also provides a computer program product which, when run on a computer, causes the computer to perform the method of the above embodiments.

the present disclosure also provides a computer program, comprising: instructions that, when executed by a processor, cause the processor to perform the method as described in the above embodiments.

It should be noted that in the text, relational terms such as "first" and "second" are only used to distinguish one entity or operation from another entity or operation, and do not necessarily require or imply any actual relationship or order between these entities or operations. Moreover, the terms "comprise", "include", or any other variation thereof are intended to encompass non-exclusive inclusion, such that a process, method, item, or device that comprises a series of elements not only comprises those elements, but also comprises other elements that are not explicitly listed, or also comprises elements inherent to such process, method, item, or device. If without further limitations, the elements limited by the statement "comprise one . . . " do not exclude the existence of other identical elements in the process, method, item, or device that comprises the elements.

The above is only the detailed description of the embodiments of the present disclosure, which enables those skilled in the art to understand or realize the present disclosure. The various modifications to these embodiments will be apparent to those skilled in the art, and the general principles defined herein can be implemented in other embodiments without departing from the spirit or scope of the present disclosure. Therefore, the present disclosure will not be limited to the embodiments described herein, but rather conform to the widest scope consistent with the principles and novel features disclosed herein.

What is claimed is:

1. An image processing method, comprising:
   acquiring a mask image of a target object, wherein the target object is in a moving state or a static state, a prop image is in a moving state, the mask image comprises an additional feature of the target object, the additional feature represents a feature associated with the target object, and the mask image is obtained by operating pixel values corresponding to an image or an image frame of the target object with a mask; and
   displaying the target object and the prop image based on a position relationship between the mask image of the target object and the prop image during movement of the prop image around the target object, in response to the prop image having a shielding relationship with the target object during a moving process of the prop image, wherein
   the displaying of the target object and the prop image based on the position relationship between the mask image of the target object and the prop image comprises:
      determining an overlapping portion of the prop image and the mask image of the target object, the prop image being divided into at least two portions, each portion of the at least two portions having a display attribute corresponding to the respective portion, and the display attribute comprising display or not display; and determining whether to display the overlapping portion of the prop image according to a display attribute corresponding to the overlapping portion.

2. The image processing method according to claim 1, wherein the prop image is a two-dimensional plane image.

3. The image processing method according to claim 2, wherein the determining of whether to display the overlapping portion of the prop image according to a display attribute corresponding to the overlapping portion comprises:
   for each coordinate point of the overlapping portion, determining that the each coordinate point belongs to a target portion of the prop image;
   in response to the display attribute of the target portion being display, the each coordinate point displaying a pixel point of the prop image; and
   in response to the display attribute of the target portion being not display, the each coordinate point displaying a pixel point of the target object.

4. The image processing method according to claim 2, wherein the displaying of the target object and the prop image based on the position relationship between the mask image of the target object and the prop image further comprises: determining the display attribute of the overlapping portion.

5. The image processing method according to claim 4, wherein the determining of the display attribute of the overlapping portion comprises:
   establishing a plane coordinate system based on a center point O of the prop image in response to dividing the prop image into a front portion of the prop image and a back portion of the prop image;
   acquiring each coordinate point of the overlapping portion after determining the overlapping portion of the prop image and the mask image of the target object;
   indicating that the display attribute of the overlapping portion is display in response to a coordinate point on an X-axis corresponding to the overlapping portion being greater than 0; and
   indicating that the display attribute of the overlapping portion is not display in response to the coordinate point on the X-axis corresponding to the overlapping portion being less than 0.

6. The image processing method according to claim 1, wherein the prop image is a three-dimensional stereo image, and
   the displaying of the target object and the prop image based on the position relationship between the mask image of the target object and the prop image comprises:
   acquiring an overlapping portion of the mask image of the target object and the prop image;
   for each coordinate point of the overlapping portion, acquiring first depth information of the each coordinate point of the mask image, and acquiring second depth information of the each coordinate point of the prop image; and
   determining that the each coordinate point displays a pixel point of the target object or displays a pixel point of the prop image based on a value of the first depth information and a value of the second depth information.

7. The image processing method according to claim 6, wherein the determining of that the each coordinate point displays a pixel point of the target object or displays a pixel point of the prop image based on the value of the first depth information and the value of the second depth information comprises:

determining that the each coordinate point displays the pixel point of the prop image in response to the value of the first depth information being greater than the value of the second depth information; and determining that the each coordinate point displays the pixel point of the target object in response to the value of the first depth information being less than the value of the second depth information.

8. The image processing method according to claim 6, wherein the acquiring of the first depth information of the each coordinate point of the mask image comprises:

constructing a target object box based on the mask image, wherein the target object box has depth information; and determining the first depth information of the each coordinate point of the mask image based on the depth information of the target object box.

9. The image processing method according to claim 8, wherein a center point of the target object box is a center point of the target object, height information of the target object box is a height from a highest point of the target object to a lowest point of the target object, and width information of the target object box is a width from a leftmost point of the target object to a rightmost point of the target object.

10. The image processing method according to claim 8, wherein the acquiring of the second depth information of the each coordinate point of the prop image comprises:

determining the second depth information of the prop image based on position information of the prop image relative to a center point of the target object box.

11. An electronic device, comprising:

one or more processors; and a storage device configured to store one or more programs, wherein the one or more programs, when executed by the one or more processors, cause the one or more processors to:

acquire a mask image of a target object, wherein the target object is in a moving state or a static state, a prop image is in a moving state, the mask image comprises an additional feature of the target object, the additional feature represents a feature associated with the target object, and the mask image is obtained by operating pixel values corresponding to an image or an image frame of the target object with a mask; and display the target object and the prop image based on a position relationship between the mask image of the target object and the prop image during movement of the prop image around the target object, in response to the prop image having a shielding relationship with the target object during a moving process of the prop image, wherein the displaying of the target object and the prop image based on the position relationship between the mask image of the target object and the prop image comprises:

determining an overlapping portion of the prop image and the mask image of the target object, the prop image being divided into at least two portions, each portion of the at least two portions having a display attribute corresponding to the respective portion, and the display attribute comprising display or not display; and determining whether to display the overlapping portion of the prop image according to a display attribute corresponding to the overlapping portion.

12. The electronic device according to claim 11, wherein the prop image is a two-dimensional plane image.

13. The electronic device according to claim 12, wherein the one or more programs, when executed by the one or more processors, cause the one or more processors to:

for each coordinate point of the overlapping portion, determine that the each coordinate point belongs to a target portion of the prop image;

in response to the display attribute of the target portion being display, make the each coordinate point display a pixel point of the prop image; and in response to the display attribute of the target portion being not display, make the each coordinate point display a pixel point of the target object.

14. The electronic device according to claim 12, wherein the one or more programs, when executed by the one or more processors, further cause the one or more processors to determine the display attribute of the overlapping portion.

15. The electronic device according to claim 14, wherein the one or more programs, when executed by the one or more processors, cause the one or more processors to:

establish a plane coordinate system based on a center point O of the prop image in response to dividing the prop image into a front portion of the prop image and a back portion of the prop image;

acquire each coordinate point of the overlapping portion after determining the overlapping portion of the prop image and the mask image of the target object;

indicate that the display attribute of the overlapping portion is display in response to a coordinate point on an X-axis corresponding to the overlapping portion being greater than 0; and indicate that the display attribute of the overlapping portion is not display in response to the coordinate point on the X-axis corresponding to the overlapping portion being less than 0.

16. A non-transitory computer-readable storage medium having stored thereon a computer program which, when executed by a processor, causes the processor to:

acquire a mask image of a target object, wherein the target object is in a moving state or a static state, a prop image is in a moving state, the mask image comprises an additional feature of the target object, the additional feature represents a feature associated with the target object, and the mask image is obtained by operating pixel values corresponding to an image or an image frame of the target object with a mask; and display the target object and the prop image based on a position relationship between the mask image of the target object and the prop image during movement of the prop image around the target object, in response to the prop image having a shielding relationship with the target object during a moving process of the prop image, wherein the displaying of the target object and the prop image based on the position relationship between the mask image of the target object and the prop image comprises:

determining an overlapping portion of the prop image and the mask image of the target object, the prop image being divided into at least two portions, each portion of the at least two portions having a display attribute corresponding to the respective portion, and the display attribute comprising display or not display; and determining whether to display the overlapping portion of the prop image according to a display attribute corresponding to the overlapping portion.

17. The non-transitory computer-readable storage medium according to claim 16, wherein the prop image is a two-dimensional plane image.

18. The non-transitory computer-readable storage medium according to claim 17, wherein the computer program, when executed by the processor, causes the processor to:

for each coordinate point of the overlapping portion, determine that the each coordinate point belongs to a target portion of the prop image;

in response to the display attribute of the target portion being display, make the each coordinate point display a pixel point of the prop image; and in response to the display attribute of the target portion being not display, make the each coordinate point display a pixel point of the target object.

19. The non-transitory computer-readable storage medium according to claim 17, wherein the computer program, when executed by the processor, further causes the processor to determine the display attribute of the overlapping portion.

20. The non-transitory computer-readable storage medium according to claim 19, wherein the computer program, when executed by the processor, causes the processor to:

establish a plane coordinate system based on a center point O of the prop image in response to dividing the prop image into a front portion of the prop image and a back portion of the prop image;

acquire each coordinate point of the overlapping portion after determining the overlapping portion of the prop image and the mask image of the target object;

indicate that the display attribute of the overlapping portion is display in response to a coordinate point on an X-axis corresponding to the overlapping portion being greater than 0; and indicate that the display attribute of the overlapping portion is not display in response to the coordinate point on the X-axis corresponding to the overlapping portion being less than 0.

*   *   *   *   *